United States Patent
Overmann et al.

(10) Patent No.: US 8,493,289 B2
(45) Date of Patent: Jul. 23, 2013

(54) SCANNING MIRROR BASED DISPLAY SYSTEM AND METHOD

(75) Inventors: Scott Patrick Overmann, Allen, TX (US); Daniel J. Morgan, Denton, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1481 days.

(21) Appl. No.: 11/935,078

(22) Filed: Nov. 5, 2007

(65) Prior Publication Data

US 2009/0116091 A1    May 7, 2009

(51) Int. Cl.
*G09G 3/00* (2006.01)

(52) U.S. Cl.
USPC .............................. 345/32; 345/204; 345/205

(58) Field of Classification Search
USPC ........................................ 345/32, 204–205
See application file for complete search history.

(56) References Cited

U.S. PATENT DOCUMENTS

| | | | |
|---|---|---|---|
| 4,737,843 A | 4/1988 | Spencer | |
| 4,750,045 A | 6/1988 | Ohara et al. | |
| 5,122,644 A * | 6/1992 | Hasegawa et al. | 235/462.26 |
| 5,489,950 A | 2/1996 | Masuda | |
| 5,764,280 A | 6/1998 | Bloom et al. | |
| 5,986,687 A * | 11/1999 | Hori | 347/246 |
| 6,020,937 A | 2/2000 | Bardmesser | |
| 6,508,554 B2 | 1/2003 | Hatakeyama et al. | |
| 6,798,575 B2 | 9/2004 | Kobayashi | |
| 7,252,394 B1 | 8/2007 | Fu | |
| 2005/0173514 A1 * | 8/2005 | Mackenzie | 235/375 |
| 2008/0106764 A1 * | 5/2008 | Fujino | 358/2.1 |
| 2008/0316561 A1 * | 12/2008 | Okugawa | 359/201 |

* cited by examiner

*Primary Examiner* — William Boddie
*Assistant Examiner* — Leonid Shapiro
(74) *Attorney, Agent, or Firm* — Warren L. Franz; Wade J. Brady, III; Frederick J. Telecky, Jr.

(57) ABSTRACT

Scanning mirror based display system and method. A method comprises sampling a scanned light provided by a scanning mirror, converting the sampled scanned light into an electrical signal, analyzing the electrical signal to determine a position of the scanned light, and controlling the light source or the scanning mirror based on the analyzed electrical signal. The electrical signal based on the sampled scanned light may be used to ensure proper operation of the scanning mirror display system, such as determining failure of the scanning mirror, proper rendering of colors, determining whether the scanned light is following a desired scan path at a desired scan rate, and so forth.

10 Claims, 3 Drawing Sheets

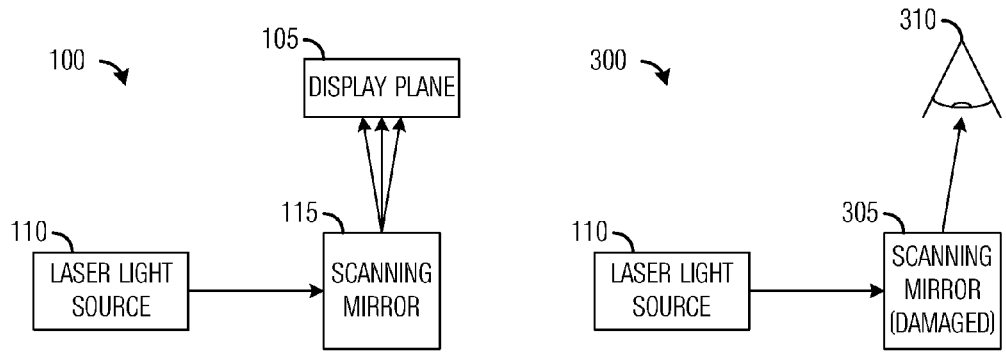
Fig. 1
Fig. 3
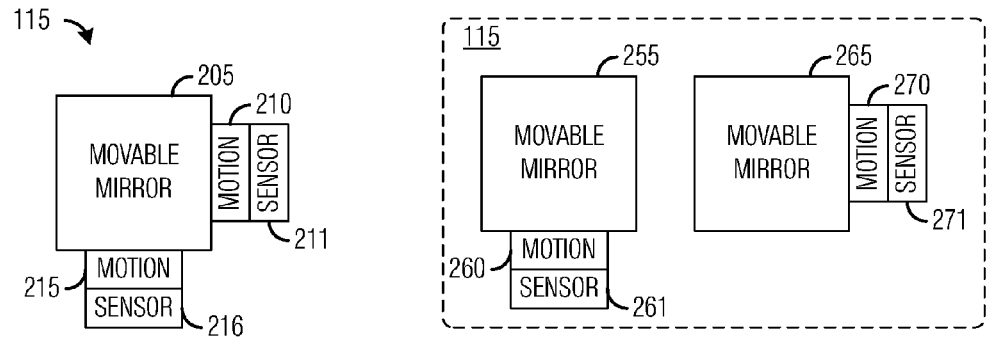
Fig. 2a (Prior Art)
Fig. 2b (Prior Art)
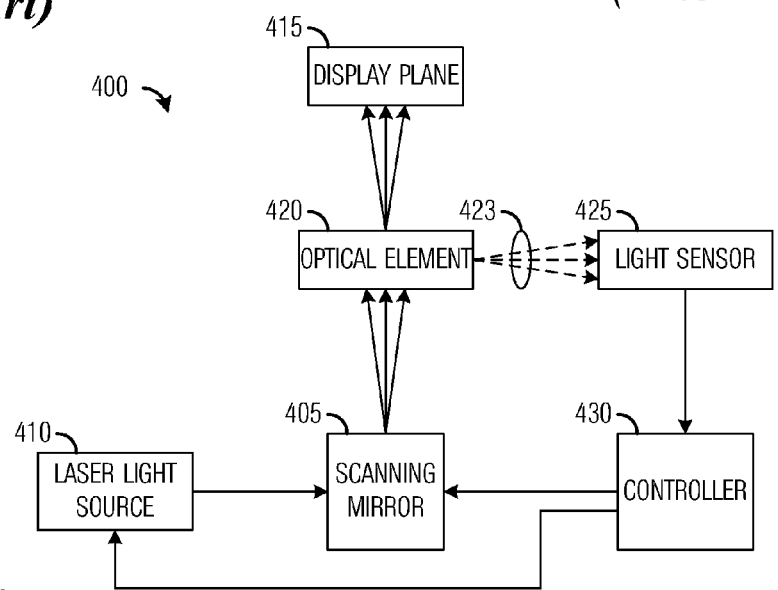
Fig. 4

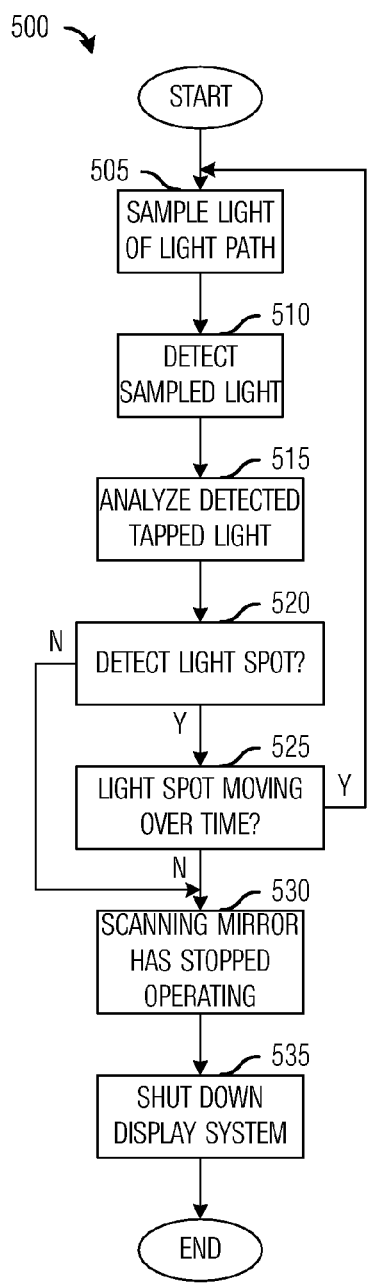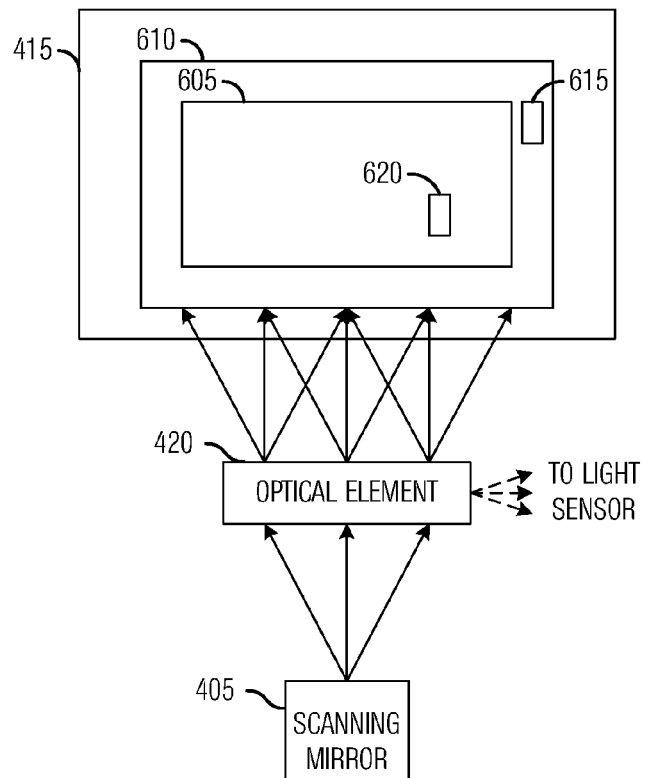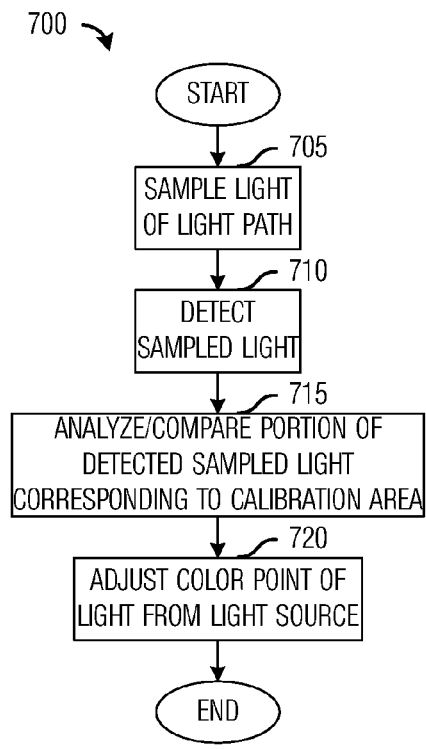
Fig. 5
Fig. 6
Fig. 7

SCANNING MIRROR BASED DISPLAY SYSTEM AND METHOD

TECHNICAL FIELD

The present invention relates generally to a system and method for displaying information, and more particularly to a scanning mirror based display system and method.

BACKGROUND

Projection display systems illuminated by laser light may use a microdisplay, such as a digital micromirror device (DMD), transmissive or reflective liquid crystal display (LCD), liquid crystal on silicon (LCoS), ferroelectric liquid crystal on silicon, deformable micromirrors, and so forth, or a scanning mirror to generate an image on a display plane. In general, a microdisplay in a projection display system will create a miniature version of the image to be displayed and through the use of optical lenses and elements, project an enlarged version of the image on the display plane.

FIG. 1 illustrates a simplified scanning mirror display system 100. The scanning mirror display system 100 may create an image on a display plane 105 by scanning a light spot created by a light source, such as a laser light source 110, over the display plane 105. A scanning mirror 115 may be used to scan the light spot over the display plane 105 and individual picture elements may be created by modulating the light spot. In the scanning mirror display system 100, one or more scanning mirrors may be used to create the image on the display plane 105. If a single scanning mirror is used, then the single scanning mirror may have two degrees of freedom to move the light spot to create a two-dimensional image. If two scanning mirrors are used, then each scanning mirror may have a single degree of freedom to move the light spot to create a one-dimensional beam of light. The combination of the two one-dimensional beams of light created by the two scanning mirrors may create a two-dimensional image. A cathode ray tube television may be analogous to a scanning mirror display system wherein a scanned beam of electrons and a phosphor coated screen replace the scanned light spot and the display plane.

FIG. 2a illustrates a detailed view of a prior art scanning mirror 115. The scanning mirror includes a movable mirror 205 having two degrees of freedom. A first motion unit 210 may move the movable mirror 205 along a first of the two degrees of freedom and a first sensor 211 may detect movement of the movable mirror 205 along the first degree of freedom. A second motion unit 215 may move the movable mirror 205 along a second of the two degrees of freedom and a second sensor 216 may detect movement of the movable mirror along the second degree of freedom. The first motion unit 210 and the second motion unit 215 may make use of electrostatic forces to move the movable mirror 205. Alternatively, the first motion unit 210 and the second motion unit 215 may be micromotors. The first sensor 211 and the second sensor 216 may be used to detect the movement of the movable mirror 205 as well as provide positional information regarding the position of the movable mirror 205.

FIG. 2b illustrates a detailed view of a prior art scanning mirror 115. The scanning mirror 115 includes two movable mirrors, a first movable mirror 255 and a second movable mirror 265. A first motion unit 260 may move the first movable mirror 255 along a first degree of freedom and a first sensor 261 may be used to detect the movement of the first movable mirror 255. A second motion unit 270 may move the second movable mirror 265 along a second degree of freedom and a second sensor 271 may be used to detect the movement of the second movable mirror 265.

In some instances, the scanning mirror 115 may fail, such as when a pivot of the movable mirror 205 becomes jammed or is broken. Additionally, the first motion unit 210 or the second motion unit 215 or both may fail. Due to the high intensity of the light spot produced by the laser light source 110, the scanning mirror display system 100 with the scanning mirror 115 that has failed may pose a health hazard to viewers of the scanning mirror display system 100. FIG. 3 illustrates a hazardous situation arising from a scanning mirror display system 300 with a failed scanning mirror 305. If viewers were to look directly into a light path of the scanning mirror display system 300, it may be possible for viewers to look directly into the light spot. Extended viewing of the light spot may cause damage to eyes 310 of the viewers.

Scanning mirror display systems utilizing scanning mirrors with sensors, such as the scanning mirror 115 shown in detail in FIG. 2, may be able to detect the failure of the scanning mirror 115 through information provided by the first sensor 211 and the second sensor 216. However, it may be possible for the sensors (the first sensor 211 and the second sensor 216) to fail and provide inaccurate information regarding the operation of the movable mirror 205.

SUMMARY OF THE INVENTION

These and other problems are generally solved or circumvented, and technical advantages are generally achieved, by embodiments of a scanning mirror based display system and a method of operating therefor.

In accordance with an embodiment, a method for operating a scanning mirror display system having a light source and a scanning mirror is provided. The method includes sampling a scanned light provided by the scanning mirror, converting the sampled scanned light into an electrical signal, analyzing the electrical signal to determine a position of the scanned light, and controlling the light source or the scanning mirror based on the analyzed electrical signal.

In accordance with another embodiment, a display system is provided. The display system includes a light source to produce light, a scanning mirror optically coupled to the light source and positioned in a light path of the display system after the light source, a controller electronically coupled to the scanning mirror and the light source, and a light sampling system optically coupled to the light source and positioned in the light path after the scanning mirror. The light sampling system is electrically coupled to the controller. The scanning mirror scans the light produced by the light source in a pattern over a display plane, the controller issues commands to control the scanning of the scanning mirror, and the light sampling system samples a portion of the scanned light and provides electrical signals based on the sampled scanned light to the controller.

In accordance with another embodiment, a method of manufacturing a display system is provided. The method includes installing a light source configured to generate light, installing a scanning mirror in a light path to scan the light generated by the light source, installing a light sampling system in the light path to sample a scanned light produced by the scanning mirror, and installing a controller configured to control the scanning mirror and the light source. The installing of the light sampling system includes installing an optical element in the light path after the scanning mirror, and installing a light sensor in a second light path created by the optical element.

An advantage of an embodiment is that a failure of a scanning mirror may be detected with greater certainty because the light output is measured directly.

A further advantage of an embodiment is that only simple hardware is required. Therefore, the impact on the cost of the scanning mirror display system may be minimized.

Yet another advantage of an embodiment is that in addition to detecting failure of a scanning mirror, the embodiment may also be utilized to adjust the performance of the scanning mirror display system.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which:

FIG. 1 is a diagram of a scanning mirror based display system;

FIGS. 2a and 2b are diagrams of prior art scanning mirrors;

FIG. 3 is a diagram of a hazardous situation arising from a scanning mirror display system with a failed scanning mirror;

FIG. 4 is a diagram of a scanning mirror based display system;

FIG. 5 is a diagram of a sequence of events in determining the status of a scanning mirror in a scanning mirror based display system;

FIG. 6 is a diagram of a portion of a scanning mirror based display system;

FIG. 7 is a diagram of a sequence of events in adjusting a color point of a scanning mirror based display system;

DETAILED DESCRIPTION OF ILLUSTRATIVE EMBODIMENTS

Figure 8:
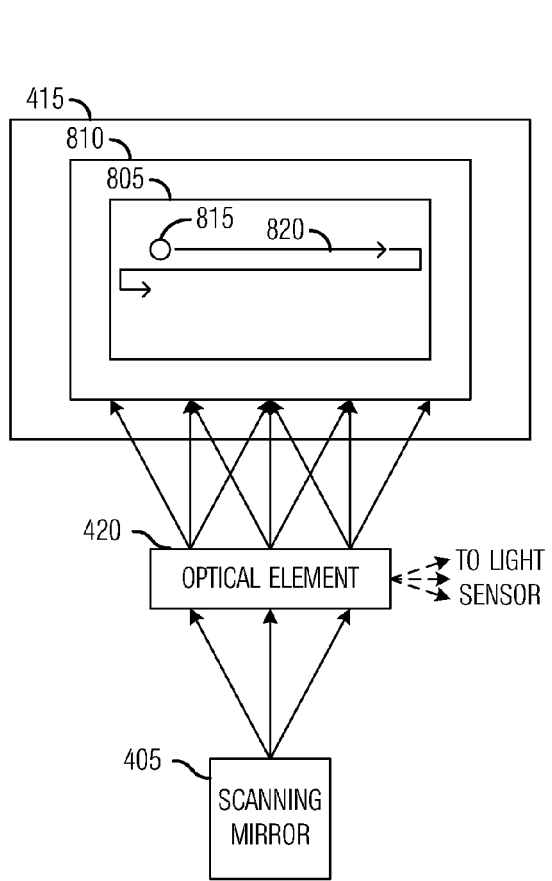
FIG. 8 is a diagram of a portion of a scanning mirror based display system.

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a scanning mirror projection display system that scans a light spot to create a two-dimensional image. The display system may be implemented in a wide variety of form factors, ranging from theater models to desktop models to small handheld models. The invention may also be applied, however, to other types of projection display systems wherein there is a desire to adjust optical performance through an optical feedback system, including scanning mirror projection display systems, that scan a line or spot of light to create a two-dimensional image.

With reference now to FIG. 4, there is shown a diagram illustrating a scanning mirror display system 400. The scanning mirror display system 400 includes a scanning mirror 405 that scans a light produced by a light source 410 to create an image on a display plane 415. The light produced by the light source 410 may be modulated to create individual picture elements as the light is scanned over the display plane 415.

An optical element 420 positioned in a light path of the scanning mirror display system 400 may sample a percentage of the light scanned by the scanning mirror 405 and redirect the sampled light onto a light sensor 425. The optical element 420 may be a neutral density filter (NDF) that samples a small fraction of the light scanned by the scanning mirror 405. For example, the sampling of the light using the NDF may result in a light loss on the order of one (1) percent or less. The use of a different type of optical element 420 may result in a greater light loss that may be achieved with the NDF, perhaps on the order of one to two (2) percent may be acceptable. In order to not significantly impact the brightness of the image displayed by the scanning mirror display system 400, the sampling of the light by the optical element 420 preferably does not result in a light loss of more than about five (5) percent of the total light produced by the scanning mirror display system 400.

In addition to a neutral density filter, other optical elements that may be used in the optical element 420 may be uncoated lens elements, panes of glass, or lens elements and panes of glass coated with an antireflective coating that provides a mismatch in the index of refraction between the optical element 420 and the air in the scanning mirror display system 400. The mismatch in the index of refraction may cause a small percentage (on the order of one to two percent) of the light scanned by the scanning mirror 405 to reflect onto the light sensor 425.

Another alternative embodiment of the optical element 420 may be a mirror that permits a small amount of light incident to its surface to pass through while reflecting a majority of the light or vice versa. The light passing through the mirror may be directed towards the light sensor 425 while the reflected light may be directed onto the display plane 415 or vice versa. In yet another alternative embodiment, used in combination with the NDF or the mirror, an additional optical element 423 may be added between the optical element 420 and the light sensor 425. The additional optical element 423 may either reduce the light to a smaller spot or expand the light to a larger spot. Adjusting the light to produce a smaller spot may permit a finer resolution of the location of the light spot on the light sensor 425, while a larger spot may keep the light sensor 425 from saturating due to the high light intensity of the light spot.

Although shown to be positioned in the scanning mirror display system 400 immediately after the scanning mirror 405, the optical element 420 may be located at a number of different positions in a light path of the scanning mirror display system 400. For example, a scanning mirror display system 400 may likely have a cover glass at the output of its projection lens. The optical element 420 may be configured to serve both as the cover glass and the optical element 420 to sample the light scanned by the scanning mirror 420 while providing a measure of protection for the projection lens. Furthermore, the optical element 420 may be located before, after, or inside a multi-lens projection lens. In general, the optical element 420 may be located in a wide range of positions between the scanning mirror 405 and the display plane 415.

The light sensor 425 may be one of a wide variety of opto-electric devices that is capable of converting light energy into electrical information. Examples of opto-electric devices may include charge coupled devices (CCD), CMOS optical sensors, and so forth. The light sensor 425 may convert the sampled light provided by the optical element 420 into electrical information suitable for processing by a controller 430. The light sensor 425 preferably has spatial and temporal measurement properties. The light sensor 425 may be a plane capable of converting light incident on its surface into electrical energy. Furthermore, the light sensor 425 may be able to periodically or continually convert the light incident on its surface into electrical information, with the electrical information changing as the light changes.

The light sensor 425 may not need to be a high resolution sensor since there may not be a need to detect a high resolution image. The number of sensor elements may be very low to help keep the cost of the light sensor low. In many portable product applications, such as a cellular telephone containing a scanning mirror display system, a personal digital data assistant, a portable computer, and so forth, a CCD or CMOS light sensor may already be present in the form of a camera sensor. The CCD or CMOS light sensor may also be used as the light sensor 425. Since it may be unlikely that the camera functionality of the portable product would be used in conjunction with displaying images, the CCD or CMOS light sensor may be used while displaying images without needing to disable the camera functionality. Reusing the CCD or CMOS light sensor as the light sensor 425 of the scanning mirror display system 400 may enable the elimination of an extra part.

The controller 430 may make use of the electrical information provided by the light sensor 425 to determine whether the light spot being scanned by the scanning mirror 405 is in motion. For example, the controller 430 may implement an algorithm to detect the light spot and then determine over time if the light spot is moving. If the light spot is not moving or if the light spot is not detected in the electrical information provided by the light sensor 425, then the controller 430 may determine that the scanning mirror 405 has failed. A detailed discussion of an algorithm for use in determining a status of the scanning mirror 405 is provided below.

In addition to processing the electrical information provided by the light sensor 425 to determine the status of the scanning mirror 405, the controller 430 may also be used to modulate the light produced by the light source 410 according to the image being displayed. Furthermore, the controller 430 may be used to ensure that the scanning mirror 405 is scanning the light spot over the display plane 415 in a desired manner. The controller 430 may also make use of electrical information provided by the light sensor 425 to calibrate the scanning mirror display system 400. Examples of the calibrations of the scanning mirror display system 400 made possible by the electrical information provided by the light sensor 425 may include color point, such as white point, calibration as well as scanning mirror 405 scan pattern calibration.

FIG. 5 illustrates a sequence of events 500 in determining the status of a scanning mirror in a scanning mirror display system. The sequence of events 500 may take place whenever the scanning mirror display system 400 is in a normal operation mode or when the scanning mirror display system 400 is outputting light. The sequence of events 500 may begin with a sampling of light being scanned by a scanning mirror, such as the scanning mirror 405 (block 505). The sampling of the light may be performed through the use of an optical element, such as the optical element 420, placed in a light path of the scanning mirror display system 400. Preferably, the optical element 420 should be placed in the light path at a point immediately after the scanning mirror 405. However, if the scanning mirror display system 400 includes lens elements that may be used to optically process the light scanned by the scanning mirror 405, the optical element 420 may be placed at any point in the light path after the scanning mirror 405. For example, the optical element 420 may be placed before the lens elements, between the lens elements if more than one element is used, after the lens elements, and so forth.

The optical element 420 may redirect a small percentage of the light to a light sensor, such as the light sensor 425. The light sensor 425 may detect the light incident on its surface (block 510). The light sensor 425 may then provide to a controller, such as the controller 430, electrical information related to the light incident on the light sensor 425.

The controller 430 may then analyze the electrical information to determine whether there is a light spot in the light incident on the light sensor 425 (block 515). The controller 430 may be able to determine if there is a light spot if the electrical information indicates that there is a region within the light incident on the surface of the light sensor 425 with a light intensity that may be significantly brighter than other regions on the surface of the light sensor 425. If the controller was not able to detect the presence of a light spot (block 520), then the scanning mirror 405 may have stopped operating (block 530). Alternatively, a light source, such as the laser light source 410, may not be producing light. The controller 430 may then shut down the scanning mirror display system 400 (block 535).

However, if the controller 430 was able to detect the presence of a light spot (block 520), the controller 430 may need to also determine if the light spot has moved over time (block 525). The controller 430 may be able to determine if the light spot has moved over time by comparing several consecutive sets of electrical information from the light sensor 425. For example, if in a first set of electrical information the light spot is in a first position, and in a second set of electrical information the light spot is in a second position, and if the first position is different from the second position, then the controller 430 may be able to determine that the light spot has moved. In addition to determining that the light spot has been moving, the controller 430 may require that the light spot has been moving in a proper pattern, with proper speed, and so forth, to ensure the proper display of the image on the display plane 415.

If the light spot has not moved over time, then the scanning mirror 405 may have stopped operating (block 530) and the controller 430 may shut down the scanning mirror display system 400 (block 535). If the light spot has moved over time, then the scanning mirror display system 400 may be operating properly. The sequence of events 500 may continue in continuous operation as long as the scanning mirror display system 400 is in a normal operating mode or as long as it is producing light.

In a further embodiment, in order to properly display images, a display system may need to render colors accurately. For example, improperly rendered colors may result in the rendering of images with inaccurate color. Generally, to accurately render colors, a displayed white point as displayed by the display system should match (or substantially match) an intended white point of colors to be displayed by the display system.

FIG. 6 illustrates a diagram of a portion of a scanning mirror display system 400 with a color point calibration system. The scanning mirror display system 400 may project on the display plane 415 an image 605 contained within an overscan area 610. At a specified location inside the overscan area 610, the scanning mirror display system 400 may project a calibration test image 615. Since the calibration test image 615 is within the overscan area 610, the calibration test image 615 may be unlikely to be noticed by viewers of the scanning mirror display system 400. The size of the calibration test image 615 may be small, on the order of a few (one-three pixels may be sufficient, depending on pixel size, sensitivity, and resolution of the light sensor 425, for example) pixels. If the light sensor 425 is sensitive, then the calibration test image 615 may be small, perhaps one-two pixels. While, if the light sensor 425 is not sensitive, then the calibration test image 615 may be large, perhaps two-three pixels or larger.

Furthermore, the frequency and the overall brightness of the calibration test image 615 may also have an effect on the likelihood of the viewers noticing the calibration test image 615. Therefore, the calibration test image 615 may be displayed at a brightness level lower than a maximum brightness of the scanning mirror display system 400 or the calibration test image 615 may be displayed periodically, or both. For instance, the calibration test image 615 may be displayed using a few least significant bits of the light produced by the scanning mirror display system and may displayed one or two times every 30 seconds. The brightness and the display frequency of the calibration test image 615 may be dependent on the sensitivity of the light sensor 425.

The light sensor 425 may then detect light directed by the optical element 420 in the area corresponding to the calibration test image 615. The light sensor 425 may provide to the controller 430 electrical information related to a detected color of the light corresponding to the calibration test image 615. Since the controller 430 generally has knowledge of an intended color of the calibration test image 615, it may compare the electrical information provided by the light sensor 425 with the intended color of the calibration test image 615. If the intended color matches (within a threshold) the detected color, then the scanning mirror display system 400 may be projecting images with the correct color point. If the intended color does not match detected color, then the scanning mirror display system 400 may need to adjust the colored light it is projecting to correct the color point mismatch. For example, in a three-color RGB scanning mirror display system, the scanning mirror display system 400 may make use of the detected color to rebalance percentages of the individual R, G, and B color components to achieve the desired white point.

In addition to using the calibration test image 615 in the overscan area 610, the scanning mirror display system 400 may make use of the image being displayed. If the image being displayed contains a large expanse of a known color, then the controller 430 may make use of a small portion of the expanse, shown as area 620, in its comparison of detected color versus intended color. The controller 430 may utilize the electrical information from the light sensor 425 and interpolate the white point of the scanning mirror display system 400 with color science mathematics and techniques. The color science mathematics and techniques are considered to be well understood by those of ordinary skill in the art and will not be discussed herein.

FIG. 7 illustrates a sequence of events 700 in the adjusting of a color point of a scanning mirror display system. The sequence of events 700 may be executed periodically to help ensure that a scanning mirror display system, such as the scanning mirror display system 400, is projecting a desired color point. Ensuring that the desired color point is being projected may help to improve the quality of the images being displayed by the scanning mirror display system 400. The adjusting of the color point may begin with a sampling of light from a light path of the scanning mirror display system 400 (block 705). Preferably, the sampling of the light occurs at a point in the light path after the scanning mirror 405.

A light sensor, such as the light sensor 425, may detect the light incident on its surface (block 710). The light sensor 425 may then provide to a controller, such as the controller 430, electrical information related to the light incident on the light sensor 425.

The controller 430, knowing an expected location of a calibration test image, may analyze the electrical information in an area corresponding to the expected location of the calibration test image (block 715). The controller 430 may then compare a detected color point as provided by the electrical information of the light sensor 425 with the desired color point (block 715). If the detected color point is sufficiently different in color from the desired color point, then the controller 430 may make necessary adjustments to light produced by a light source, such as the light source 410, to make the light produced by the light source 410 closer to the desired color point (block 720). The adjusting of the color point may occur continuously or it may occur periodically.

In a further embodiment, since the scanning mirror display system 400 projects images by rapidly scanning a light produced by the light source 410 over the display plane 415, the scanning of the light by the scanning mirror 405 may need to occur with a degree of precision. For example, if the scanning occurs too rapidly or too slowly, then the image displayed by the scanning mirror display system 400 may be distorted. Similarly, if the scanned light does not travel along an expected path, then the image displayed may be distorted.

FIG. 8 illustrates a diagram of a portion of a scanning mirror display system 400 with a scan path feedback control system. The scanning mirror display system 400 may project on the display plane 415 an image 805 contained within an overscan area 810. The image 805 may be created by scanning a light spot 815 along a scan path 820. The scanning of the light spot 815 occurs at a sufficiently high frequency such that it may be integrated into an image by a viewer's eyes.

The light sensor 425 may then convert a sample of the light in the light path of the scanning mirror display system 400 into electrical signals that may be processed by the controller 430. The controller 430 may process the electrical signals to find the position of the light spot 815. The position of the light spot 815 may be compared with an expected position of the light spot 815. If the position of the light spot 815 and the expected position of the light spot 815 do not match within acceptable tolerance, then the scanning mirror 405 may not be scanning the light spot 815 properly. Alternatively, the position of the light spot 815 over time may be analyzed by the controller 430 to determine if the light spot 815 is being scanned in a proper pattern and at a proper rate. The controller 430 may make any adjustments to the scanning of the scanning mirror 405 as needed to ensure that the light spot 815 is being scanned properly.

Figure 9:
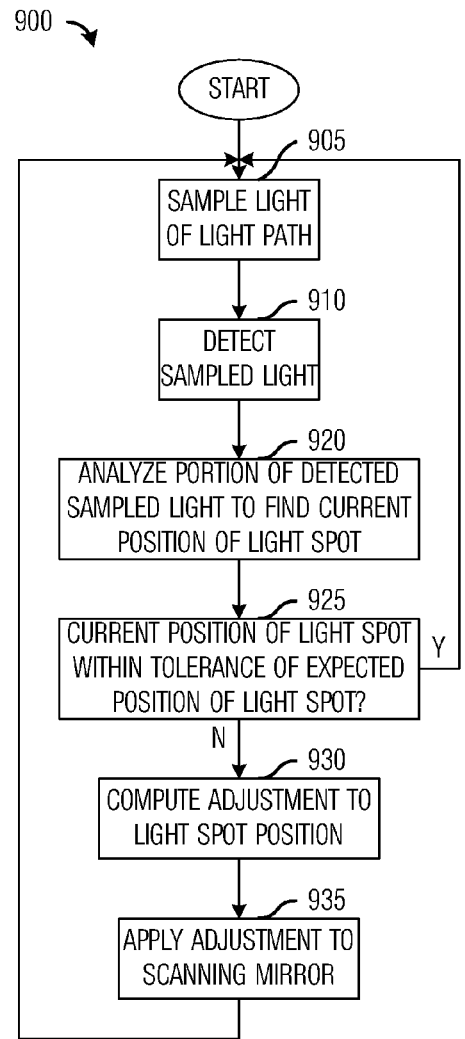
FIG. 9 is a diagram of a sequence of events in the control of the scanning operation of a scanning mirror.

FIG. 9 illustrates a sequence of events 900 in the control of the scanning operation of a scanning mirror in a scanning mirror display system. The sequence of events 900 may take place periodically to help ensure that a scanning mirror, such as the scanning mirror 405, of a scanning mirror display system, such as the scanning mirror display system 400, is scanning properly. Ensuring that the scanning mirror 405 is operating properly may help to improve the quality of the images being displayed by the scanning mirror display system 400. The control of the scanning operation of the scanning mirror 405 may begin with a sampling of light from a light path of the scanning mirror display system 400 (block 905). Preferably, the sampling of the light occurs at a point in the light path after the scanning mirror 405.

A light sensor, such as the light sensor 425, may detect the light incident on its surface (block 910). The light sensor 425 may then provide to a controller, such as the controller 430, electrical information related to the light incident on the light sensor 425.

The controller 430 may analyze the electrical information to determine a position of the light spot 815 (block 920). The controller 430 may then determine if the light spot 815 is located in a position that is within an accepted tolerance of an expected position of the light spot (block 925). If the light spot 815 is located in such a position, then the scanning mirror 405 may be deemed as scanning properly and the control of the scanning operation of the scanning mirror 405 may return to block 905 to continue controlling the scanning operation of the scanning mirror 405.

If the light spot 815 is not located in such a position (block 925), then the controller 430 may need to compute an adjustment to provide to the scanning mirror 405 to move the light spot 815 to the expected position (block 930) and provide the adjustment to the scanning mirror 405 (block 935). After providing the adjustment to the scanning mirror 405, the control of the scanning operation of the scanning mirror 405 may return to block 905 to continue controlling the scanning operation of the scanning mirror 405.

Alternatively, rather than comparing the position of the light spot 815 with an expected position, the controller 430 may maintain a history of the position of the light spot 815 over a period of time. The history of the position of the light spot 815 may enable the controller 430 to not only determine if the light spot 815 is in an expected position, but also determine if the light spot 815 is being scanned in a proper scan pattern and with a proper scan rate. For example, the controller 430 may be able to determine if the light spot 815 is being scanned in a straight line, at a constant rate, and so forth.

Figure 10:
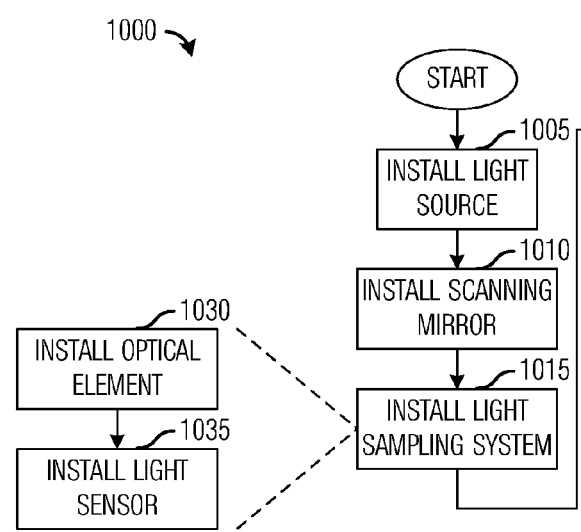
FIG. 10 is a diagram of a sequence of events in the manufacture of a scanning mirror based display system.

FIG. 10 illustrates a sequence of events 1000 in the manufacture of a scanning mirror display system. The manufacture of the scanning mirror display system may begin with installing a light source, preferably a laser light source, which may produce multiple colors of light (block 1005). The manufacture may continue with installing a scanning mirror in the light path of the multiple colors of light produced by the light source (block 1010). After installing the scanning mirror, a light sampling system may be installed (block 1015). The light sampling system may be installed in the light path of the multiple colors of light after the scanning mirror. This may be followed by installing a controller (block 1020) and a display plane (block 1025). The controller may be electrically coupled to the scanning mirror and the light sampling system, while the display plane may be in the light path of the multiple colors of light.

The installing of the light sampling system may include the installing of an optical element to sample a scanned light scanned by the scanning mirror (block 1030) and a light sensor (block 1035). The optical element may be in the light path of the multiple colors of light after the scanning mirror, while the light sensor may be in a light path created by the optical element. Additionally, the light sensor may be electrically coupled to the controller. The order of the manufacturing steps may be varied depending on the specific implementation.

Although the embodiments and their advantages have been described in detail, it should be understood that various changes, substitutions and alterations can be made herein without departing from the spirit and scope of the invention as defined by the appended claims. Furthermore, the spot motion detection, the white point detection, and scan analysis may be implemented separately or in any combination with each other. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. In an imaging system wherein a modulated laser light spot is scanned by a scanning mirror onto a display surface, a method of detecting cessation of movement of the light spot, comprising:

throughout a scanning interval, directing a portion of light of the scanned light spot during scanning by the scanning mirror onto the display surface onto a light sensor;

determining spatial and temporal positioning of the scanned light spot throughout the time interval based on electrical signals from the light sensor; and where such determination indicates cessation of movement of the scanned light spot, controlling at least one of the laser light spot or the scanning mirror to discontinue directing the laser light spot onto the display surface; and further comprising scanning the modulated laser light spot with a test image in an overscan area not scanned onto the display surface; and calibrating at least one of a scanning pattern or color point based on the electrical signals from the light sensor sensing the portion of light from scanning in the overscan area.

2. The method of claim 1, wherein the imaging system is contained within a portable device including a camera; and the light sensor is an imaging light sensor of the camera.

3. The method of claim 1, wherein scanning the light spot in the overscan area is done with a lower brightness level than a maximum brightness level than for scanning the light spot onto the display surface.

4. The method of claim 2, wherein the light sensor is a CCD or CMOS imaging light sensor of the camera.

5. The method of claim 4, wherein the device is a cellular telephone, a PDA or a portable computer.

6. The method of claim 5, wherein the portion of the light is directed onto the light sensor by an optical element positioned in an optical path between the scanning mirror and the display surface which reflects the portion while transmitting a remainder of the light.

7. The method of claim 6, wherein the optical element is a filter or a mirror.

8. The method of claim 1, wherein the spatial and temporal positioning is determined by implementing an algorithm to determine whether the scanned light spot is moving over time.

9. The method of claim 5, further comprising calibrating a scanning pattern for scanning by the scanning mirror using the determined spatial and temporal positioning.

10. The method of claim 9, further comprising calibrating a color point for modulating the laser light spot using the electrical signals from the light sensor.

* * * * *